Jan. 15, 1957 R. WANKE ET AL 2,777,363
PHOTOGRAPHIC OBJECTIVE COMPRISING TWO COLLECTIVE AND
TWO DISPERSIVE MEMBERS ENCLOSING A DIAPHRAGM
Filed March 23, 1955
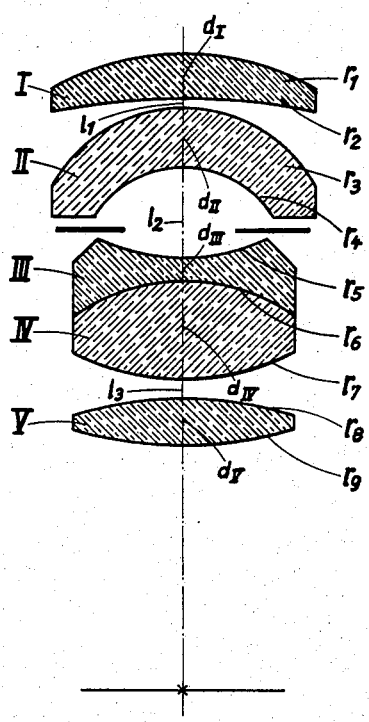
Inventors:
Rudolf Wanke
Harry Zöllner

United States Patent Office 2,777,363
Patented Jan. 15, 1957

2,777,363

PHOTOGRAPHIC OBJECTIVE COMPRISING TWO COLLECTIVE AND TWO DISPERSIVE MEMBERS ENCLOSING A DIAPHRAGM

Rudolf Wanke and Harry Zöllner, Jena, Germany, assignors to VEB Carl Zeiss Jena, Jena, Germany Application March 23, 1955, Serial No. 496,104

3 Claims. (Cl. 88—57)

This invention relates to an objective for photographic purposes of the kind having two dispersive meniscus members which are situated between two collective members and on opposite sides of the diaphragm, wherein the concave surfaces of the meniscus members face each other and the meniscus member situated in front of the diaphragm is not cemented while the one situated behind the diaphragm consists of two cemented lenses.

With a view to obtaining with only five lenses a particularly light intensive objective of this kind which is suitable for photographing and in particular for projection, both collective members are according to the invention formed as simple lenses, the focal length of the foremost lens being greater than 1:3 times and smaller than 1:6 times the focal length of the objective and furthermore the focal length of that part of the objective which is situated behind the diaphragm is greater than 0.75 times and smaller than the 0.85 times the focal length of the objective proper.

In order to obtain favourable correction factors, it is preferred to select the refractive indices of all lenses greater than 1.60. It is also advantageous, if the difference between the refractive indices of the two cemented lenses of the dispersive meniscus member is greater than 0.005 and smaller than 0.015.

One embodiment of the invention is illustrated, by way of example only, in the figure of the accompanying drawing which shows an objective with an aperture ratio of 1:1.4 and focal length of 100 which fulfills all of the required conditions. The objective consists of five lenses I to V.

The values shown in the following table apply for the radii $r_1$ to $r_9$, the thicknesses $d_\mathrm{I}$ to $d_\mathrm{V}$, the air-spaces $l_1$ to $l_3$, the refractive indices $n_{d\mathrm{I}}$ to $n_{d\mathrm{V}}$ and the Abbe numbers $\nu_\mathrm{I}$ to $\nu_\mathrm{V}$. The focal length of the lens I is $f_\mathrm{I}=151$ and the focal length of the parts III, IV, V of the objective which is situated behind the diaphragm is 79.5.

Example of values

| | |
|---|---|
| $r_1=+\ 73.672$ | $d_\mathrm{I}=12.737$ |
| $r_2=+324.885$ | $l_1=\ 0.291$ |
| $r_3=+\ 46.086$ | $d_\mathrm{II}=18.633$ |
| $r_4=+\ 29.135$ | $l_2=20.816$ |
| $r_5=-\ 46.304$ | $d_\mathrm{III}=\ 4.075$ |
| $r_6=+\ 46.304$ | $d_\mathrm{IV}=32.097$ |
| $r_7=-\ 64.668$ | $l_3=\ 0.727$ |
| $r_8=+\ 98.579$ | $d_\mathrm{V}=22.854$ |
| $r_9=-139.126$ | |

| Lens | I | II | III | IV | V |
|---|---|---|---|---|---|
| Type of glass | | | | | |
| $n_d$ | 1.61995 | 1.6045 | 1.6722 | 1.6642 | 1.61995 |
| $\nu$ | 60.5 | 60.5 | 32.2 | 56.2 | 60.5 |

We claim:
1. Objective for photographic purposes with two dispersive meniscus members situated between two collective members arranged on opposite sides of the diaphragm of a camera, the concave surfaces of said meniscus members facing each other, the meniscus member situated in front of said diaphragm being uncemented, the meniscus member situated behind said diaphragm consisting of two cemented lenses, both said collective members being uncemented, the focal length of the foremost of said collective members being greater than 1.3 times and smaller than 1.6 times the focal length of said objective and the focal length of that part of said objective which is situated behind said diaphragm being greater than 0.75 times and smaller than 0.85 times the focal length of said objective proper.

2. Objective for photographic purposes with two dispersive meniscus members situated between two collective members arranged on opposite sides of the diaphragm of a camera, the concave surfaces of said meniscus members facing each other, the meniscus member situated in front of said diaphragm being uncemented, the meniscus member situated behind said diaphragm consisting of two cement lenses, both said collective members being uncemented, the focal length of the foremost of said collective members being greater than 1.3 times and smaller than 1.6 times the focal length of said objective and the focal length of that part of said objective which is situated behind said diaphragm being greater than 0.75 times and smaller than 0.85 times the focal length of said objective proper, the refractive indices of all said lenses being greater than 1.60.

3. Objective for photographic purposes with two dispersive meniscus members situated between two collective members arranged on opposite sides of the diaphragm of a camera, the concave surfaces of said meniscus members facing each other, the meniscus member situated in front of said diaphragm being uncemented, the meniscus member situated behind said diaphragm consisting of two cemented lenses, both said collective members being uncemented, the focal length of the foremost of said collective members being greater than 1.3 times and smaller than 1.6 times the focal length of said objective and the focal length of that part of said objective which is situated behind said diaphragm being greater than 0.75 times and smaller than 0.85 times the focal length of said objective proper, the refractive indices of all said lenses being greater than 1.60 and the difference between the refractive indices of the two cemented lenses of said dispersive meniscus member situated behind said diaphragm being greater than 0.005 and smaller than 0.015.

References Cited in the file of this patent

UNITED STATES PATENTS

| 583,336 | Rudolph | May 25, 1897 |
| 660,202 | Rudolph | Oct. 23, 1900 |
| 2,117,252 | Lee | May 10, 1938 |
| 2,171,640 | Berek | Sept. 5, 1939 |
| 2,499,264 | Wynne | Feb. 28, 1950 |
| 2,670,659 | Tronnier | Mar. 2, 1954 |

FOREIGN PATENTS

| 941,174 | France | June 28, 1948 |